(12) United States Patent
Brown et al.

(10) Patent No.: US 10,994,335 B2
(45) Date of Patent: May 4, 2021

(54) SELECTIVE SOLIDIFICATION APPARATUS AND METHODS

(71) Applicant: RENISHAW PLC, Gloucestershire (GB)

(72) Inventors: Ceri Brown, Redland (GB); Geoffrey McFarland, Wickwar (GB)

(73) Assignee: RENISHAW PLC, Wotton-under-Edge (GB)

( * ) Notice: Subject to any disclaimer, the term of this patent is extended or adjusted under 35 U.S.C. 154(b) by 1214 days.

(21) Appl. No.: 15/124,287

(22) PCT Filed: Mar. 18, 2015

(86) PCT No.: PCT/GB2015/050791
§ 371 (c)(1),
(2) Date: Sep. 7, 2016

(87) PCT Pub. No.: WO2015/140547
PCT Pub. Date: Sep. 24, 2015

(65) Prior Publication Data
US 2017/0014904 A1    Jan. 19, 2017

(30) Foreign Application Priority Data
Mar. 18, 2014  (GB) ...................................... 1404854

(51) Int. Cl.
  B22F 3/105 (2006.01)
  B29C 64/153 (2017.01)
  (Continued)

(52) U.S. Cl.
  CPC ............ B22F 10/00 (2021.01); B29C 64/153 (2017.08); B22F 10/10 (2021.01); B33Y 10/00 (2014.12);
  (Continued)

(58) Field of Classification Search
  CPC .................................................... B29C 64/205
  See application file for complete search history.

(56) References Cited

U.S. PATENT DOCUMENTS 5,204,823 A     4/1993  Schlotterbeck
5,582,876 A  * 12/1996  Langer .................... B29C 41/12
                                                       427/492
(Continued)

FOREIGN PATENT DOCUMENTS

CN          101500758 A      8/2009
DE      102007040755 A1 *   3/2009  ........... B23K 26/127
(Continued)

OTHER PUBLICATIONS

Espacenet translation of DE102007040755 retrieved on Dec. 5, 2019 (Year: 2009).*

(Continued)

*Primary Examiner* — Keith D. Hendricks
*Assistant Examiner* — Joshua S Carpenter
(74) *Attorney, Agent, or Firm* — Oliff PLC

(57) ABSTRACT

A selective solidification apparatus includes a build chamber, a build platform lowerable in the build chamber, a wiper for spreading powder material across the build platform to form successive powder layers of a powder bed, an energy beam unit for generating an energy beam for consolidating the powder material, a scanner for directing and focusing the energy beam onto each powder layer and a processor for controlling the scanner. The processor is arranged to control the scanner to scan the energy beam across the powder bed to consolidate powder material either side of the wiper when the wiper is moving across the powder bed and to scan the energy beam across at least one of the powder layers during two or more strokes of the wiper across the powder bed.

17 Claims, 11 Drawing Sheets

(51) Int. Cl.
  *B33Y 10/00* (2015.01)
  *B22F 10/00* (2021.01)
  *B33Y 30/00* (2015.01)
  *B33Y 50/02* (2015.01)
  *B22F 10/10* (2021.01)

(52) U.S. Cl.
  CPC ............... *B33Y 30/00* (2014.12); *B33Y 50/02* (2014.12); *Y02P 10/25* (2015.11)

(56) References Cited

U.S. PATENT DOCUMENTS

| | | | |
|---|---|---|---|
| 5,780,070 | A | 7/1998 | Yamazawa et al. |
| 6,042,774 | A | 3/2000 | Wilkening et al. |
| 6,861,613 | B1 | 3/2005 | Meiners et al. |
| 8,083,513 | B2 | 12/2011 | Montero-Escuder et al. |
| 8,172,562 | B2 | 5/2012 | Mattes |
| 2004/0094728 | A1 | 5/2004 | Herzog et al. |
| 2008/0156263 | A1* | 7/2008 | Montero-Escuder ........... B22F 3/1055 118/695 |
| 2012/0021976 | A1 | 1/2012 | Boyle et al. |
| 2012/0286663 | A1 | 11/2012 | Puvanakijjakorn et al. |
| 2014/0052288 | A1* | 2/2014 | El-Siblani ............ G05B 19/042 700/119 |
| 2015/0165524 | A1 | 6/2015 | Ljungblad et al. |

FOREIGN PATENT DOCUMENTS

| | | |
|---|---|---|
| DE | 102007040755 A1 | 3/2009 |
| DE | 202009016400 U1 | 4/2011 |
| DE | 102011106380 A1 | 12/2012 |
| EP | 1005415 B1 | 12/2004 |
| EP | 2 286 982 A1 | 2/2011 |
| JP | 2003-245981 A | 9/2003 |
| JP | 2009-007605 A | 1/2009 |
| WO | 96/23647 A2 | 8/1996 |
| WO | 02/36331 A2 | 5/2002 |
| WO | 2010/007396 A1 | 1/2010 |
| WO | 2013/117185 A1 | 8/2013 |

OTHER PUBLICATIONS

Jun. 16, 2015 International Search Report issued in International Patent Application No. PCT/GB2015/050791.

Jun. 16, 2015 Written Opinion issued in International Patent Application No. PCT/GB2015/050791.

Sep. 17, 2014 Search Report issued in British Patent Application No. GB1404854.0.

Jan. 2, 2018 Office Action issued in Chinese Patent Application No. 201580026642.1.

Apr. 20, 2018 Search Report issued in European Patent Application No. 17209159.7.

* cited by examiner

SELECTIVE SOLIDIFICATION APPARATUS AND METHODS

FIELD OF INVENTION

This invention concerns selective solidification apparatus and methods in which powder layers are solidified in a layer-by-layer manner to form an object. The invention has particular, but not exclusive application, to selective laser solidification apparatus, such as selective laser melting (SLM) and selective laser sintering (SLS) apparatus.

BACKGROUND

Selective laser melting (SLM) and selective laser sintering (SLS) apparatus produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

A problem with such apparatus is that it can take a long time to build an object, often days and, for very large objects, over a week.

Wipers are also used in stereolithography to accelerate the formation of a plane surface of the photocurable liquid resin suitable for subsequent curing with a laser beam. Displacement of the wiper and control of the laser beam can be carried out simultaneously in such a manner that the beam follows the wiper and strikes the resin layer within the region immediately behind the wiper. Examples of such arrangements are disclosed in U.S. Pat. Nos. 5,582,876, 5,780,070 and 5,204,823.

3D Systems' SmartSweep™ method provides a further enhancement wherein the recoater blade does not travel the entire length of the resin vat but only sweeps across the part of the vat where the part is being built.

U.S. Pat. No. 8,172,563 discloses a device for manufacturing a three-dimensional object in which a material application device extends in a radial direction across a maximum radial extension of a circular build platform and the build platform is rotated (either in a continuous or stepwise manner) and lowered to move the wiper around the build platform to form a material layer. In one embodiment, four material application devices are provided and material is solidified in four solidification regions located between the material application devices.

DE102007040755 discloses a laser sintering device for producing three-dimensional objects comprising ten coating devices for applying layers or powder. Each coating device may be associated with a laser.

SUMMARY OF INVENTION

According to a first aspect of the invention there is provided a selective solidification apparatus comprising a build chamber, a build platform lowerable in the build chamber, a wiper for spreading powder material across the build platform to form successive powder layers of a powder bed, an energy beam unit for generating an energy beam for consolidating the powder material, a scanner for directing and focusing the energy beam onto each powder layer and a processor for controlling the scanner, wherein the processor is arranged to control the scanner to scan the energy beam across the powder bed to consolidate powder material either side of the wiper when the wiper is moving across the powder bed.

The processor may be arranged to control the scanner to scan the energy beam across at least one of the powder layers during two or more strokes of the wiper across the powder bed. The two or more strokes may comprise a stroke in which the wiper forms the powder layer and one or more subsequent strokes. The one or more subsequent strokes may comprise a stroke in which the wiper forms a subsequent powder layer. Additionally or alternatively, the one or more subsequent strokes may comprise a return stroke in which the wiper does not form a powder layer. A first region on the powder layer may be consolidated by the energy beam when the wiper is moving away from the first region during formation of the powder layer with the wiper and a second region on the powder layer may be consolidated by the energy beam when the wiper is moving towards the second region during the subsequent stroke.

It in this way, an object can be formed more quickly because powder is consolidated during the time that the wiper is moving across the powder bed. Accordingly, it may be possible to shorten build times compared to consolidating powder with the energy beam after the wiper has finished forming a layer. Furthermore, the area(s) of the powder bed being consolidated is not limited by the location of the wiper because powder located either side of the wiper can be consolidated during a wiper stroke. In particular, scanning the energy beam across at least one powder layer during two or more strokes may reduce a build time compared to completing the entire scanning of the powder layer during an initial stroke of the wiper and before a further stroke. This may allow optimization of the scanning strategy beyond simply scanning the energy beam behind the wiper. In particular, a cross-section of the object(s) being formed tends to cover a small area relative to the total cross-section of the powder bed and therefore, the energy beam spot will spend the majority of the time localised in small areas of the powder bed. Allowing the energy beam to scan both sides of the wiper enables the energy beam to consolidate powder in these small areas during movement of the wiper.

The processor may be arranged to control the scanner to change a focus of the energy beam to adjust for a change in a level of an (upper) surface of the powder bed such that an energy spot having a preset profile is maintained on the surface of the powder bed.

During spreading of a powder layer, a level (height) of the surface of the powder bed either side of the wiper will differ. Accordingly, in one embodiment, during spreading of powder by the wiper, the processor may control the scanner to change a focus of the energy beam to compensate for a change in level of the powder bed as the energy spot is moved from one side of the wiper to the other as the wiper moves across the powder bed.

In the case of a wiper that spreads powder across the powder bed in only one direction, the build platform may be lowered to provide clearance of the wiper on its return (non-spreading) stroke. Accordingly, the processor may control the scanner to change a focus of the energy beam to compensate for a change in level of the upper surface of the powder bed between an out stroke and a return stroke of the wiper.

The processor may be arranged to control the scanner to scan the energy beam across the powder bed during moving, such as lowering, of the build platform. The processor may be arranged to control the scanner to scan the energy beam across the powder bed such that, during lowering of the build platform, an angle of the energy beam to a surface of the powder bed remains above a preset angle, the preset angle being greater than an angle that the energy beam can make to the surface of the powder bed when the build platform is not being lowered. In this way, changes in a location of the energy beam on the surface of the powder bed during lowering of the build platform are reduced compared to scanning the energy beam at angles below the preset angle. The preset angle may be set by the user. The preset angle may depend on a required accuracy and thickness of the powder layers.

The build platform may be lowered or raised during spreading of powder across the powder bed with the wiper to provide a layer of variable thickness. All three of scanning the laser beam with the wiper, spreading a layer with the wiper and lowering or raising of the build platform may occur simultaneously. Lowering of the build platform may occur continuously throughout the build. This may increase the speed of the build as delays in the spreading of powder whilst the build platform is lowered may be avoided.

The energy beam may be an electron beam or a laser beam.

The scanner may comprise movable optics for changing the focus of the laser beam.

The scanner may comprise tilting optics for scanning the laser spot across the powder bed, wherein the processor is arranged to control the tilting optics to automatically compensate for the fact that a single position of the tilting optics will scan different spots on the surface of the powder bed dependent on the level of the surface. Lowering of the powder bed may change a distance of the surface of the powder bed from the scanner, for conditions in which the laser beam is directed by the tilting optics at a non-perpendicular angle to the surface, changing the level of the surface of the powder bed will change the position of the laser spot on the surface. Accordingly, how the position of the tilting optics maps onto the surface of the powder bed will differ for different levels of the surface.

The apparatus may comprise a position measuring device for measuring a position of the wiper as the wiper moves across the powder bed, such as a position encoder, and the processor may be arranged to receive signals from the position measuring device and control the scanner based upon the signals from the position measuring device. For example, the processor may be arranged to adjust a timing of a scan based upon signals from the position measuring device. Providing feedback on the actual position of the wiper allows the processor to adjust the scanning sequence if the actual position of the wiper differs from an expected position.

The wiper may be capable of being moved in a direction perpendicular to the surface of the powder bed (usually a vertical direction) during the build. The wiper may be capable of being moved perpendicular to the surface of the powder bed during spreading of a layer in order to form a non-planar powder layer. Alternatively or additionally, the wiper may be capable of being moved perpendicular to the surface of the powder bed at a side of the powder bed, for example to pass over a powder heap and/or to reposition the wiper for a subsequent pass over the powder bed.

Alternatively or additionally, the processor may be arranged to control vertical movement of the build platform such that the build platform is moved vertically as the wiper moves across the powder bed. The wiper may be moved vertically synchronously with movement of the build platform, for example, to maintain a powder layer of a desired form (even) thickness. Alternatively, vertical movement of the wiper and the build platform may be such that uneven powder layers are formed. Dynamic adjustment of the wiper's vertical height with movement of the build platform may reduce or even eliminate the time at the end of each stroke that the wiper is stationary. In conventional systems, the wiper has to wait for the height of the build platform to be adjusted and for the build platform to settle before the wiper begins the next powder spreading stroke.

The apparatus may comprise a laser unit for generating a plurality of laser beams and dedicated scanners for each laser beam such that each laser beam can be independently scanned across the powder bed. The scanners may be arranged such that the powder bed can be simultaneously scanned by the laser beams both sides of the wiper. The processor may be arranged to control each scanner to scan the corresponding one of the plurality of laser beams across the powder bed to consolidate powder material either side of the wiper when the wiper is moving across the powder bed.

The processor may be arranged to control movement of the wiper based upon geometric data defining the scan paths for the or each energy beam to take in solidifying powder material in building an object layer-by-layer. For example, the processor may be able to vary speed and/or vertical height of the wiper in the formation of each layer.

According to a second aspect of the invention there is provided a method for forming an object by selective solidification, in which powder layers are solidified using an energy beam in a layer-by-layer manner to form an object, the method comprising, repeatedly, spreading powder material across a build platform with a wiper to form a powder layer of a powder bed, and, during movement of the wiper across the powder bed, scanning the energy beam across the powder bed to consolidate the powder material either side of the wiper.

The method may comprise scanning the energy beam across at least one of the powder layers during two or more strokes of the wiper across the powder bed. The two or more strokes may comprise a stroke in which the wiper forms the powder layer and one or more subsequent strokes. The one or more subsequent strokes may comprise a stroke in which the wiper forms a subsequent powder layer. Additionally or alternatively, the one or more subsequent strokes may comprise a return stroke in which the wiper does not form a powder layer. A first region on the powder layer may be consolidated by the energy beam when the wiper is moving away from the first region during formation of the powder layer with the wiper and a second region on the powder layer may be consolidated by the energy beam when the wiper is moving towards the second region during the subsequent stroke.

The method may comprise changing a focus of the energy beam to adjust for a change in a level of an (upper) surface of the powder bed such that an energy spot having a preset profile is maintained on the surface of the powder bed. The method may comprise changing the focus of the energy beam during spreading of powder by the wiper as the spot of the energy beam is moved from one side of the wiper to the other. The method may comprise changing the focus of the energy beam to compensate for a change in level of the upper surface of the powder bed between an out stroke and a return stroke of the wiper.

According to a third aspect of the invention there is provided a data carrier having instructions stored thereon, the instructions for execution by a processor for controlling a selective solidification apparatus comprising a build chamber, a build platform lowerable in the build chamber, a wiper for spreading powder material across the build platform to form successive powder layers of a powder bed, an energy beam unit for generating an energy beam for consolidating the powder material, and a scanner for directing and focusing the energy beam onto each powder layer, wherein, the instructions, when executed by the processor, cause the processor to control the scanner to carry out the method of the second aspect of the invention.

According to a fourth aspect of the invention there is provided a method of generating instructions for controlling a selective solidification apparatus comprising a build chamber, a build platform lowerable in the build chamber, a wiper for spreading powder material across the build platform to form successive powder layers of a powder bed, an energy unit for generating an energy beam for consolidating the powder material, and a scanner for directing and focusing the energy beam onto each powder layer bed to consolidate powder material either side of the wiper when the wiper is moving across the powder bed, the method comprising:—
   i) receiving geometric data defining scan paths for the energy beam to take in solidifying powder material in building an object layer-by-layer;
   ii) identifying the scan paths or parts of the scan paths to be scanned either side of the wiper by the energy beam during each stroke of the wiper.

Identifying the scan paths may comprise identifying a first set of scan paths or parts of scan paths for a powder layer to be scanned during a first stroke of the wiper across the powder bed and a second set of scan paths or parts of scan paths for the powder layer to be scanned during a second stroke of the wiper across the powder. The first stroke may be a stroke in which the wiper forms the powder layer. The second stroke may comprise a stroke in which the wiper forms a subsequent powder layer. Additionally or alternatively, the second stroke may comprise a return stroke in which the wiper does not form a powder layer. The first set of scan paths or parts of scan paths may be for consolidating a first region of the powder layer when the wiper is moving away from the first region during the first stroke and the second set of scan paths or parts of scan paths may be for consolidating a second region on the powder layer when the wiper is moving towards the second region during the second stroke.

The scan paths or parts of the scan paths to be scanned either side of the wiper by the energy beam during each stroke of the wiper may be identified based upon expected wiper movement during each stroke. Alternatively or additionally, a wiper speed or time between strokes may be determined based upon an expected time required to scan the scan paths or parts of the scan paths.

It is known to design scan paths in a set pattern wherein an area of a powder layer to be solidified is divided into distinct regions to be scanned. For example, a checkerboard or stripe pattern may be used, wherein an area to be solidified is divided into a plurality of regions having parallel sides, each region formed by a plurality of parallel scan lines formed transverse to the parallel sides. A checkerboard or stripe pattern may help to ensure that a melt front is progressed across the region at substantially the same speed for most regions of the area to be solidified. The method of the invention may comprise identifying regions to be scanned either side of the wiper by the energy beam during each stroke of the wiper. The method may comprise scheduling the order in which the regions are scanned based upon movement of the wiper. For example, the scheduling may be selected with an objective of maximising a time the energy beam solidifies material during each wiper stroke. Such an objective may be achieved by restricting the number of times the direction of the spot of the energy beam is switched from being one side of the wiper to the other side of the wiper, as the energy beam will have to be switched off during the time the scanner would direct the energy beam onto the wiper. The number of times the spot switches from one side of the wiper to the other side of the wiper may be limited to a single switch.

It is known to scan areas using a "hull and core" strategy, wherein a core of the area is formed using a set pattern of parallel scan paths, such as a raster scan (sometimes referred to as meander), checkerboard or stripe pattern, and a hull (a periphery) of the area is formed using one or more boundary scan paths that follow a shape of an edge of the area. The method may comprise identifying when to scan the energy beam along the or each boundary scan path during a stroke of the wiper such that the entire boundary scan path can be completed in one continuous scan. It will be understood that scanning with the energy beam may comprise steadily moving the spot of the energy beam along a scan path or illuminating points spaced apart along the scan path with the spot. A continuous scan as used herein may include either type of scanning. In the case of steadily moving a spot of the energy beam along the scan path, a continuous scan is a scan in which the steady movement of the spot of the energy beam is uninterrupted. In the case of illuminating points spaced apart along the scan path, a continuous scan is a scan in which adjacent points a set distance apart are progressively illuminated with a set exposure time (and constant time between exposures (which may be user defined or defined by the physical limits of the scanner)) without interruption.

The method may comprise determining scan paths based upon wiper movement. For example, an edge/end of a scan path may be selected based upon an expected position of the wiper during a time at which the scan path is being scanned.

Identifying the scan paths or parts of the scan paths to be scanned either side of the wiper by the energy beam during each stroke of the wiper may take into account a safety zone one or both sides of the wiper in which scanning should not occur. The safety zone may be determined based upon at least one or more of a potential error in a determined position of the wiper during a stroke, a potential error in timing of the scan, and an expected width of the powder mound being pushed by the wiper to form the powder layer.

According to a fifth aspect of the invention there is provided a data carrier having instructions stored thereon, the instructions, when executed by a processor, cause the processor to carry out the method of the fourth aspect of the invention.

According to a sixth aspect of the invention there is provided a selective solidification apparatus comprising a build chamber, a build platform lowerable in the build chamber, a wiper for spreading powder material across the build platform to form successive powder layers of a powder bed, a position measurement device for measuring a position of the wiper, an energy beam unit for generating an energy beam for consolidating the powder material, a scanner for directing and focusing the beam onto each powder layer and a processor for controlling the scanner and/or energy beam unit, wherein the processor is arranged to control the scanner and/or energy beam unit based upon signals from the position measurement device.

According to a seventh aspect of the invention there is provided a selective solidification apparatus comprising a build chamber, a build platform lowerable in the build chamber, a wiper for spreading powder material across the build platform to form successive powder layers of a powder bed, a energy beam unit for generating an energy beam for consolidating the powder material and a scanner for directing and focusing the energy beam onto each powder layer, wherein the wiper is arranged to move in a direction perpendicular to a surface of the powder bed.

The wiper may be arranged to move in the direction perpendicular to the surface to form non-planar powder layers.

The wiper may be arranged to move in the direction perpendicular to the surface after the wiper has moved beyond an end of the powder bed to pass over powder material pushed by the wiper and reposition the wiper such that the powder material can be pushed by the wiper in a reverse direction across the powder bed.

The data carrier of the above aspects of the invention may be a suitable medium for providing a machine with instructions such as non-transient data carrier, for example a floppy disk, a CD ROM, a DVD ROM/RAM (including -R/-RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a seventh aspect of the invention there is provided a selective solidification apparatus comprising a build chamber, a build platform movable in the build chamber, a wiper for spreading powder material across the build platform to form successive powder layers of a powder bed, an energy beam unit for generating an energy beam for consolidating the powder material and a scanner for directing and focusing the energy beam onto each powder layer, wherein the wiper is arranged to spread powder material during movement of the build platform.

The wiper may spread powder material during lowering or raising of the build platform. In this way, a layer of variable thickness can be formed.

According to an eighth aspect of the invention there is provided a method for forming an object by selective solidification, in which powder layers are solidified using an energy beam in a layer-by-layer manner to form an object, the method comprising, repeatedly, spreading powder material across a build platform with a wiper to form a powder layer of a powder bed, and, during movement of the wiper across the powder bed, moving the build platform.

DESCRIPTION OF EMBODIMENTS

Figure 1:
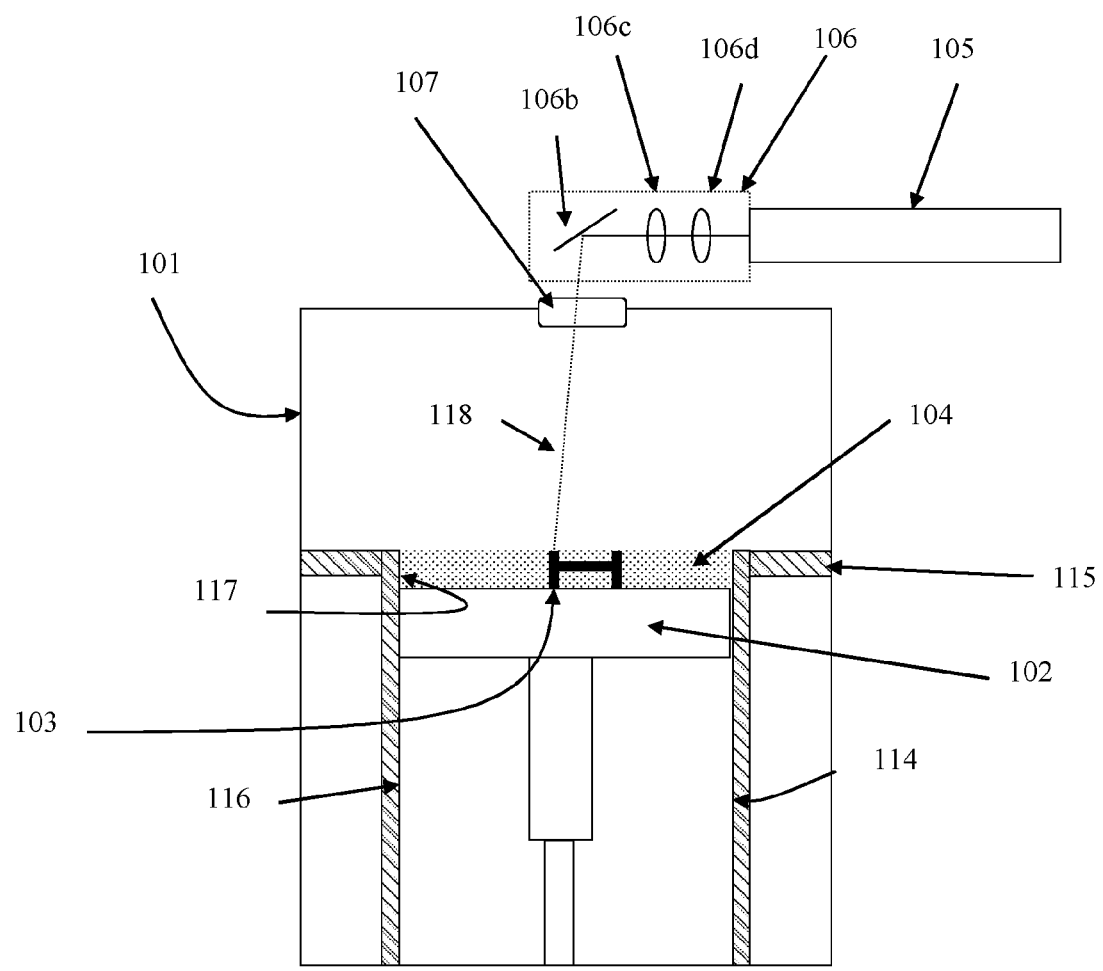
FIG. 1 is a schematic of a selective laser solidification apparatus according to an embodiment of the invention.
Figure 2:
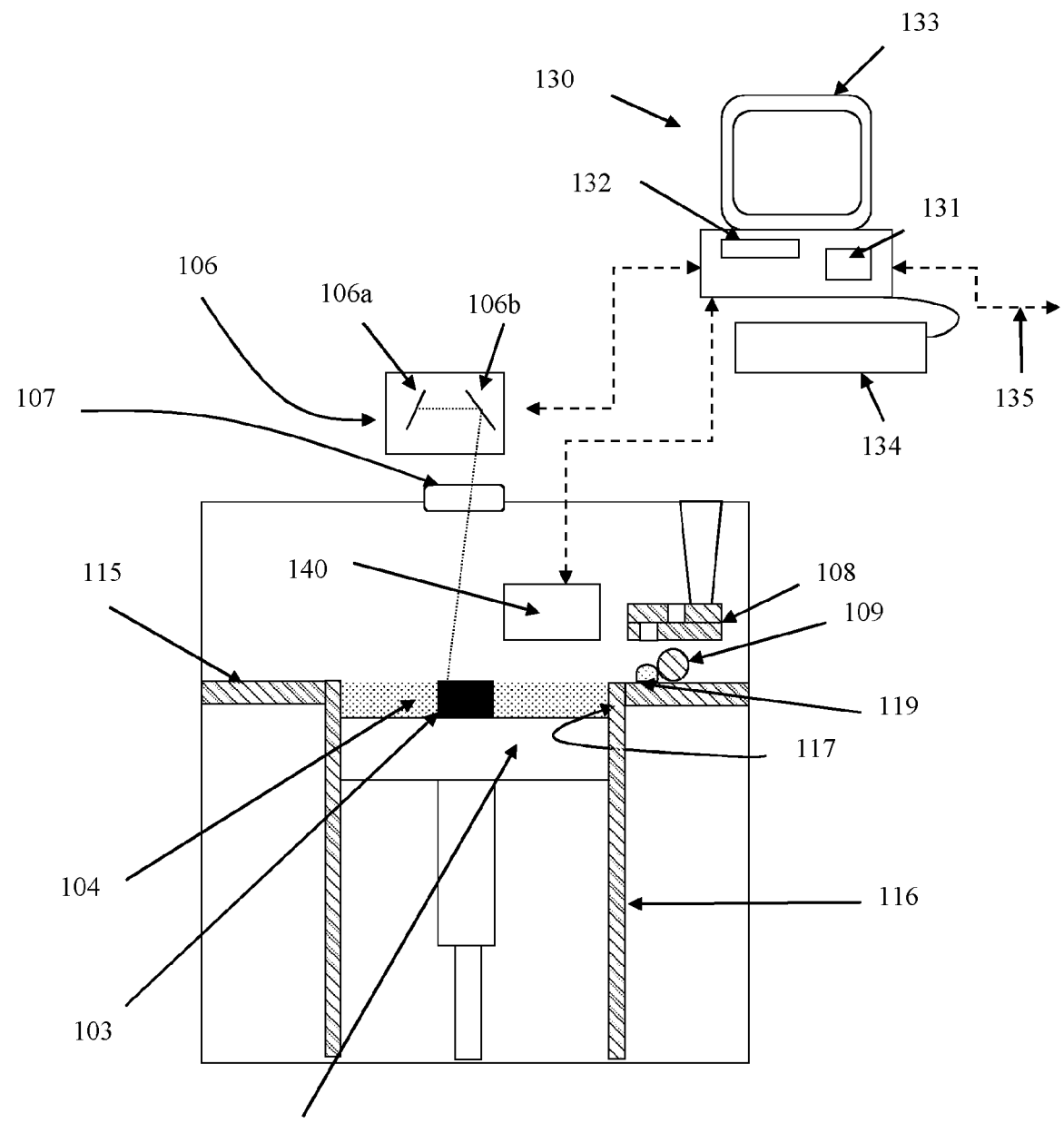
FIG. 2 is a schematic of the selective laser solidification apparatus from another side.

Referring to FIGS. 1 to 5, a laser solidification apparatus according to an embodiment of the invention comprises a main chamber 101 having therein partitions 115, 116 that define a build chamber 117 and a surface onto which powder can be deposited. A build platform 102 is provided for supporting an object 103 built by selective laser melting powder 104. The platform 102 can be lowered within the build chamber 117 as successive layers of the object 103 are formed. A build volume available is defined by the extent to which the build platform 102 can be lowered into the build chamber 117.

Layers of powder 104 are formed as the object 103 is built by dispensing apparatus 108 and an elongate wiper 109. For example, the dispensing apparatus 108 may be apparatus as described in WO2010/007396. The wiper 109 moves in a linear direction across the build platform 102 and a direction of travel during powder spreading on an out-stroke is illustrated by arrow W.

A position measuring device, in this embodiment a position encoder 140, measures a position of the wiper 109 and sends signals indicative of the measured position to a processor 131 of computer 130. The position measuring device is shown schematically as a box in FIG. 2 for clarity but will typically comprise a scale secured to a track (not shown) that guides movement of the wiper 109 and a read-head mounted to move with the wiper 109 for detecting scale markings on the scale. From the detected scale markings, a position of the wiper can be determined.

A laser module 105 generates a laser for melting the powder 104, the laser directed as required by optical scanner 106 under the control of a computer 130. The laser enters the chamber 101 via a window 107.

The optical scanner 106 comprises steering optics, in this embodiment, two movable mirrors 106a, 106b for directing the laser beam to the desired location on the powder bed 104 and focusing optics, in this embodiment a pair of movable lenses 106c, 106d, for adjusting a focal length of the laser beam. Motors (not shown) drive movement of the mirrors 106a and lenses 106b, 106c, the motors controlled by processor 131.

Computer 130 comprises the processor unit 131, memory 132, display 133, user input device 134, such as a keyboard, touch screen, etc, a data connection to modules of the laser melting unit, such as optical module 106 and laser module 105, the position measuring device 140 and an external data connection 135. Stored on memory 132 is a computer program that instructs the processing unit to carry out the method as now described.

Processor receives via external connection 135 geometric data describing scan paths to take in solidifying areas of powder in each powder layer. To build a part, the processor controls the scanner 106 to direct the laser beam in accordance with the scan paths defined in the geometric data. In this embodiment, to perform a scan along a scan path, the laser 105 and scanner 106 are synchronised to expose a series of discrete points along the scan path to the laser beam. For each scan path, a point distance, point exposure time and spot size is defined. In an alternative embodiment, the spot may be continuously scanned along the scan path. In such an embodiment, rather than defining a point distance and exposure time, a velocity of the laser spot may be specified for each scan path.

In use, the geometric data is received by the processor 131. The processor 131 analyses the scan paths defined in the geometric data to determine which scan paths or which parts of the scan paths should be scanned one side of the wiper 109 and which scan paths or which parts of the scan paths should be scanned the other side of the wiper 109. In this embodiment, wherein the wiper only spreads powder in one direction, the processor 131 may also determine which scan paths or which parts of the scan paths are to be scanned by the laser beam on a out-stroke of the wiper 109 (in which powder is spread by the wiper 109) and which scan paths or which parts of the scan paths are to be scanned by the laser beam on a return stroke of the wiper 109 (in which powder is not spread by the wiper 109).

Figure 3:
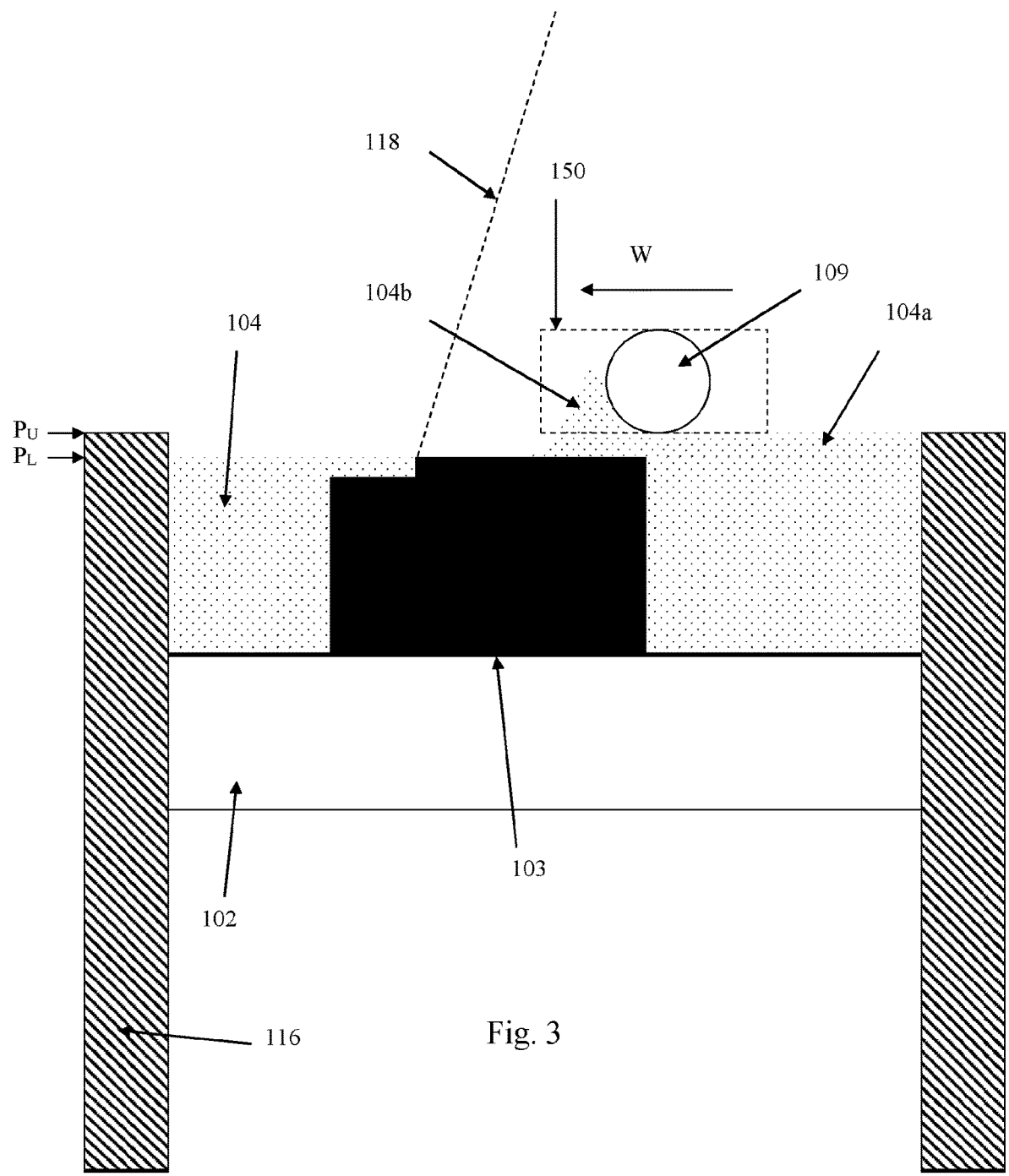
FIG. 3 is a schematic of the apparatus in operation with a laser beam being scanned over the powder bed one side of the wiper whilst the wiper spreads powder on an out stroke.

Once the processor 131 has determined the scanning schedule for each powder layer, the processor 131 controls the scanner 106 to scan each powder layer in accordance with the scan paths and scanning schedule. FIG. 3 shows the wiper 109 on an out-stroke spreading a powder layer 104a across the powder bed 104. The laser beam first scans in front of the wiper 109, solidifying areas of a previously formed powder layer, completing any solidification that is to be carried out in this powder layer before it is covered by the next powder layer. To solidify powder in front of the wiper on an out stroke of the wiper 109, the scanner 106 focuses the laser beam to maintain a desired laser spot size on a lower plane $P_L$, which coincides with the top surface of the powder bed in front of the wiper 109. The scheduling of the scan is selected by the processor 131 such that scanning occurs outside of a forbidden zone 150 around the wiper 109. Maintaining scanning outside of the forbidden zone 150 ensures that the wiper 109 is not damaged though proximity to the melt pool generated by the laser beam and the powder mound 104b pushed across the powder bed 104 by the wiper 109 is not melted by the laser beam.

Figure 4:
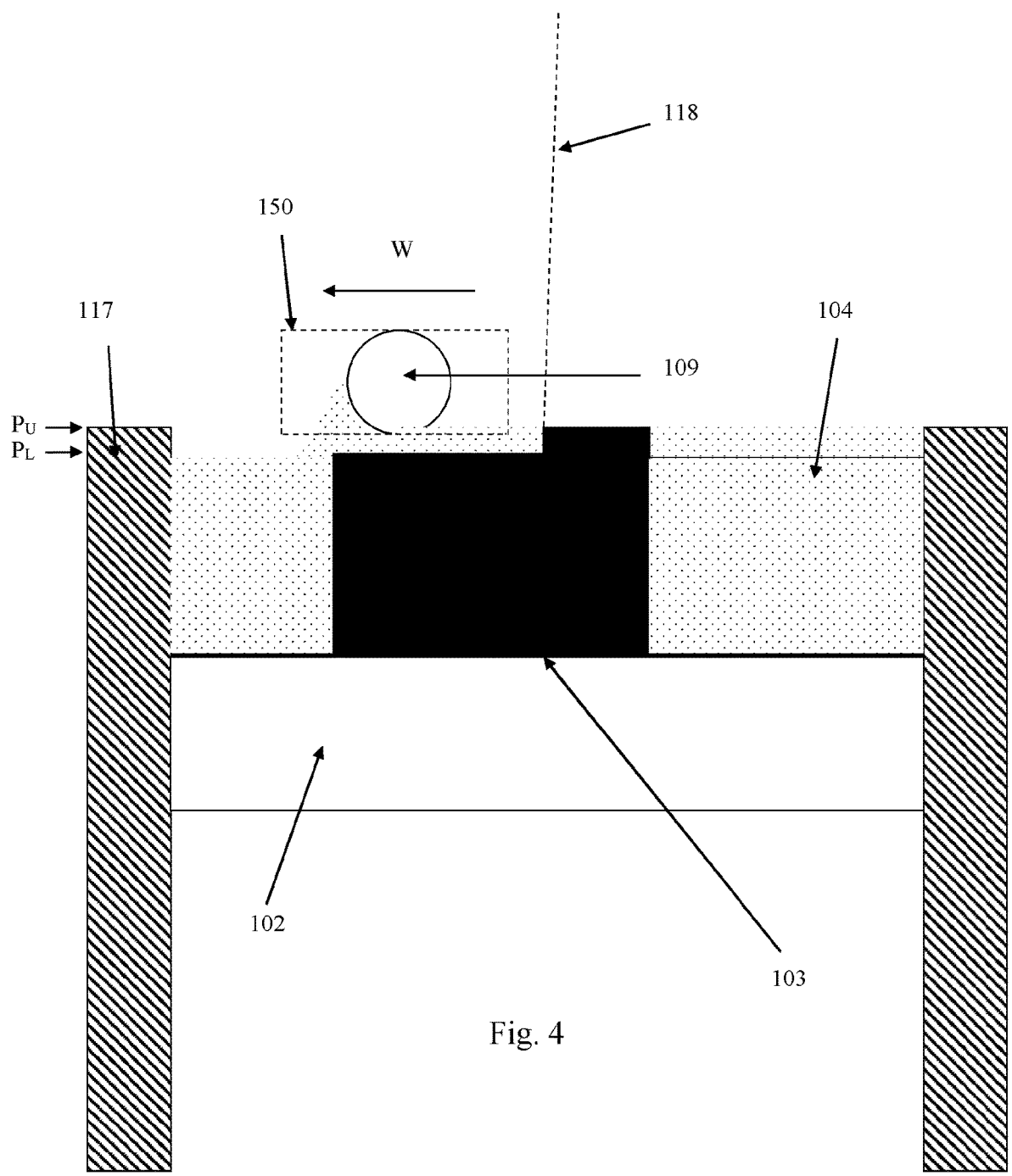
FIG. 4 is a schematic of the apparatus in operation with the laser beam being scanned over the powder bed the other side of the wiper (to that shown in FIG. 3) whilst the wiper spreads powder on an out stroke.

During the out stroke of the wiper 109, the laser beam is moved from scanning in front of the wiper to scanning behind the wiper 109. During a period in which the scanner 106 would direct the laser spot into the forbidden zone 150, the laser is switched off by processor 131. When the laser is switched back on, the scanner focuses the laser beam to maintain a desired laser spot size on an upper plane $P_U$ corresponding to the higher surface of the powder bed 104 that is behind the wiper 109. This is shown in FIG. 4. The scanner 106 directs the laser beam along the scan paths scheduled for this configuration.

Scanning of the powder bed may continue after the wiper 109 has moved to a position beyond the powder bed 104. For example, a time required to solidify a desired area in a powder layer may be greater than the time it takes the wiper to pass over the powder bed on the out and return strokes. Accordingly, scanning may occur when the wiper 109 is paused at a side of the powder bed 104 (either between the out and return stroke or when powder is being dispensed by dosing unit 108). This may be useful when scanning scan paths that extend over a significant portion of the powder bed 104.

The movement of the wiper 109 may be dynamically controlled by the processor 131 based on the size of the area to be solidified in a layer and/or the scan paths. For example, the time the wiper 109 is stationary between strokes may be varied or a speed of the wiper 109 as it moves over the powder bed may be varied.

Before the return stroke, the build platform 102 is lowered to provide clearance between the top of the powder bed 104 and the wiper 109. Typically, the build platform 102 is lowered by a distance equivalent to the thickness of the next powder layer to be spread by the wiper 109.

Figure 5:
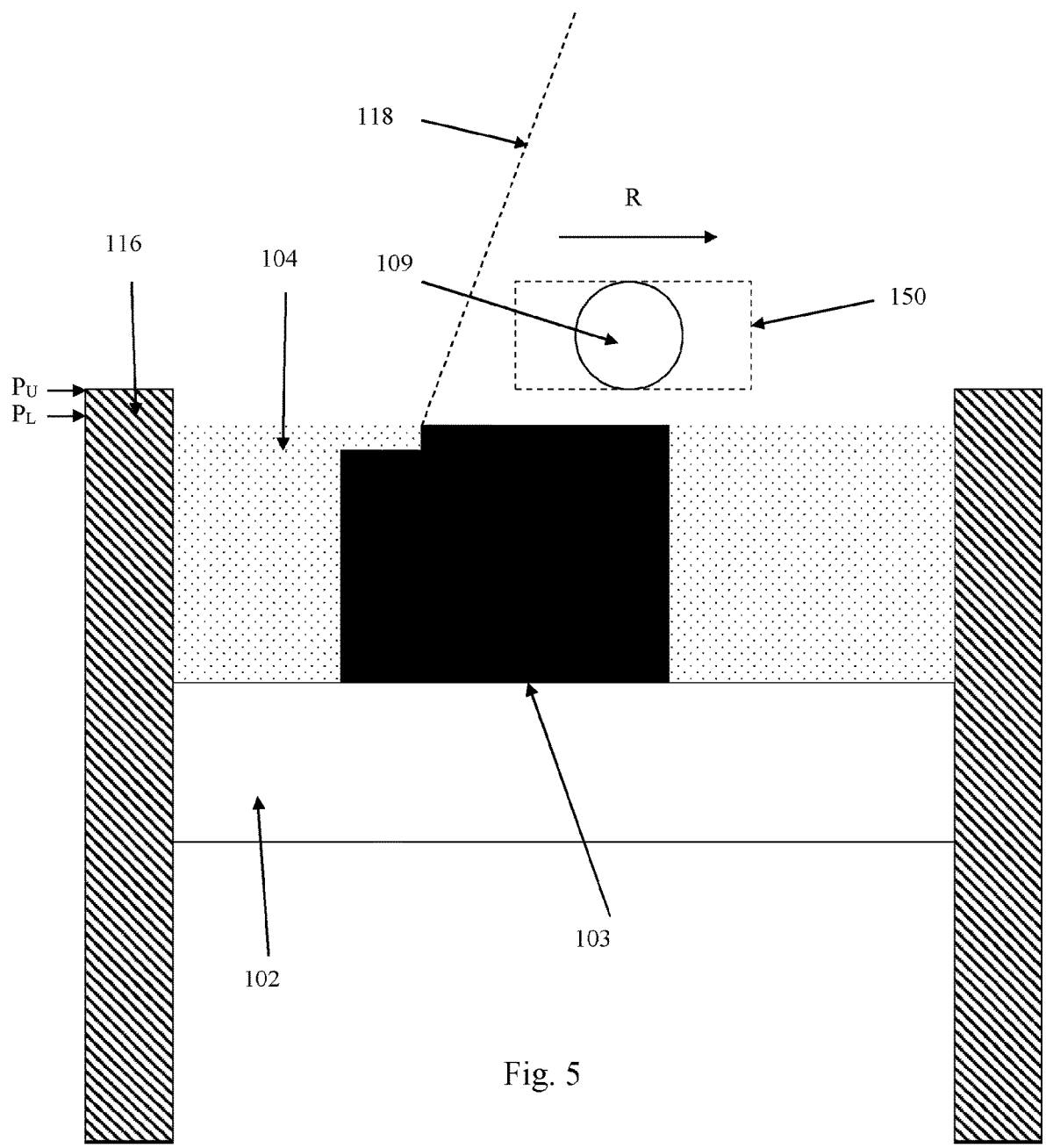
FIG. 5 is a schematic of the apparatus in operation with the laser beam being scanned over the powder bed on a return stroke of the wiper.

FIG. 5 shows the wiper 109 on the return stroke moving in a direction, R. The scanner 106 is controlled by the processor 131 to scan the laser beam both in front of and behind the wiper 109 along the scan paths scheduled to be scanned at this time. During the return stroke, the scanner focuses the laser beam to maintain a desired laser spot size on the lower plane $P_L$ to take account of the lowering of the build platform 102. As with the out stroke, when the laser beam is moved from scanning in front of the wiper 109 to behind the wiper 109 or vice-versa, the laser is switched off during a period in which the scanner 106 would direct the laser spot into the forbidden zone 150.

Figure 6:
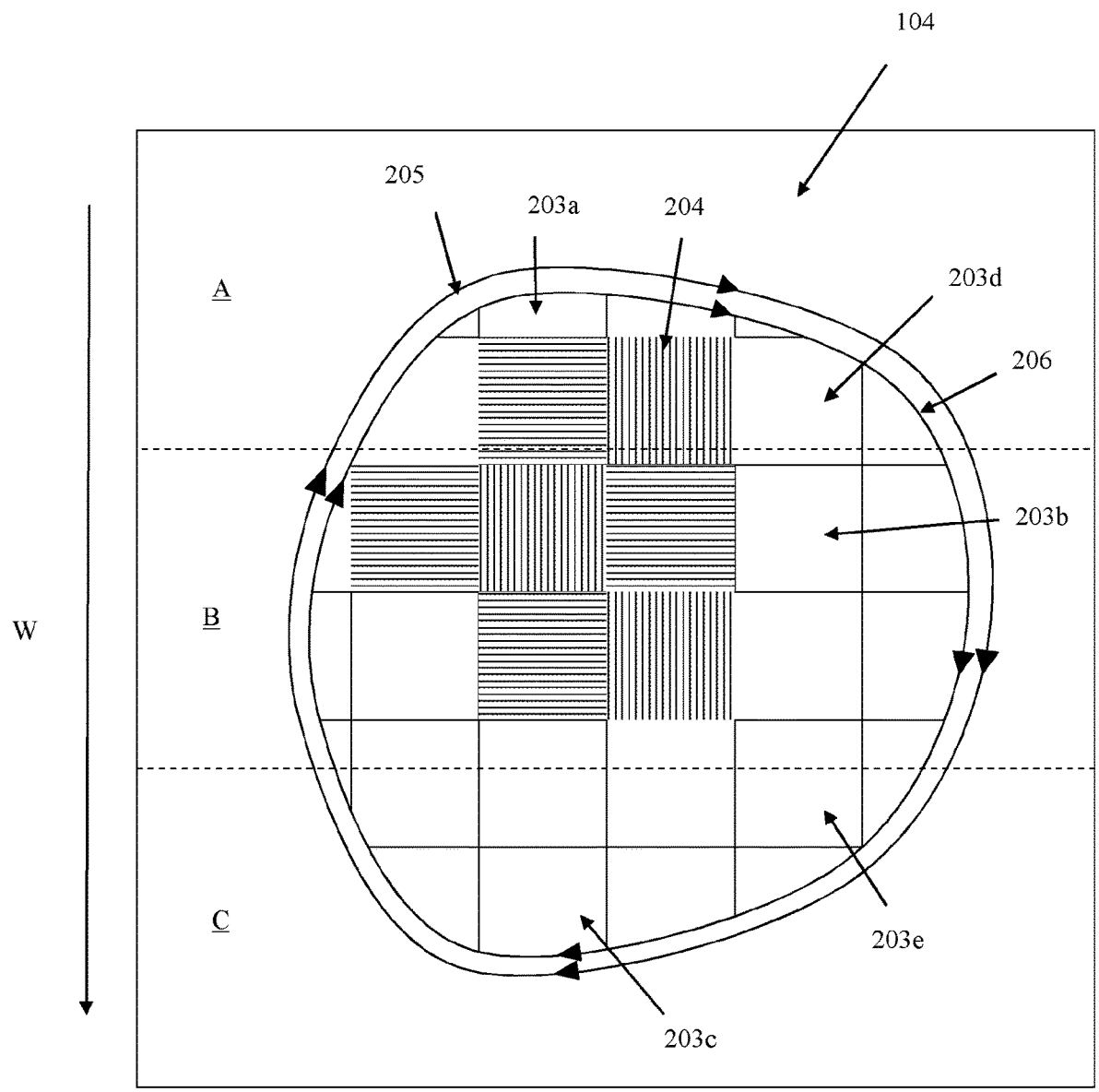
FIG. 6 shows scan paths for an area to be solidified in a powder layer, in which a core of the area is to be formed using a checkerboard pattern of scan paths.
Figure 7:
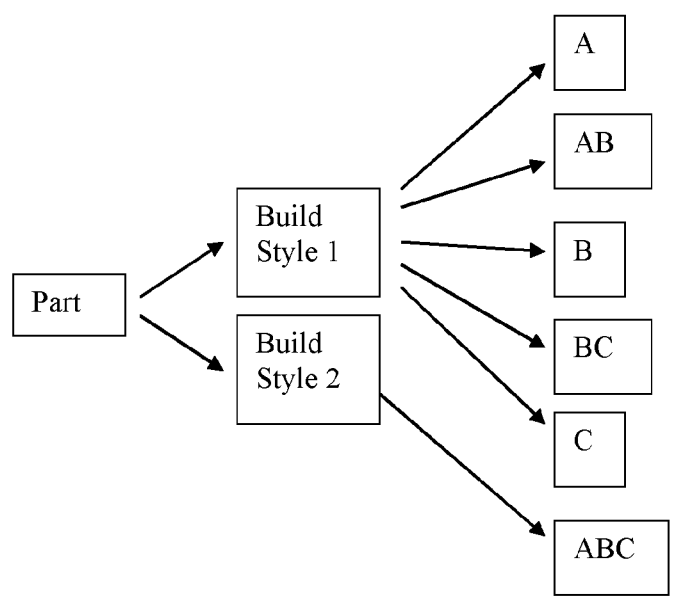
FIGS. 7 & 8 are diagrammatic representations of a method for sorting regions of an area to be solidified into an order to be scanned during out and return strokes of the wiper.
Figure 8:
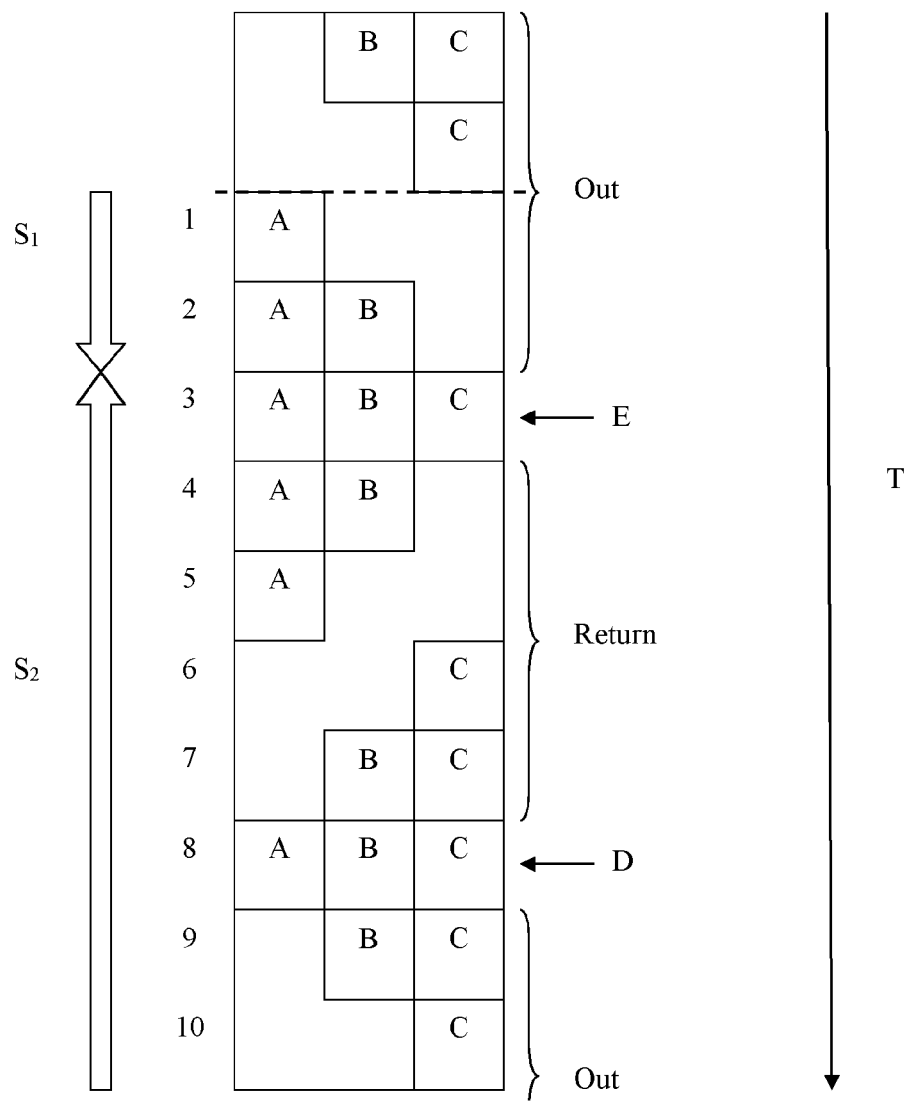

An example of how the scanning of scan paths may be scheduled is illustrated in FIGS. 6 to 8. FIG. 6 shows scan paths for solidifying an area in a powder layer. A "hull and core" strategy is used wherein a core 201 of the area is scanned using one build style/parameters and the hull is formed using a different build style/parameters.

In FIG. 6, a checkerboard pattern of scan paths is used to form the core, wherein an area of the core 201 is divided into a plurality of square regions 203, each square region 203 comprising a plurality of parallel scan paths 204 (in FIG. 6, the parallel scan paths 204 are only shown for some of the square regions 203 for clarity). For each square region 203, the parallel scan paths 204 are scanned perpendicularly to the scan paths 204 of adjacent square regions 203. The parallel scan paths 204 of equal length help to ensure that a melt front, generated through scanning of the paths 204 with a laser, progresses at substantially the same speed for each square region 203 such that substantially the same properties of the solidified material are obtained across the core 201 of the area. Rotating the angle at which the parallel scan paths 204 are formed for adjacent square regions 203 helps to avoid the formation of lines of weakness (stratification) across the core 201. In FIG. 6, the checkerboard pattern is shown as being parallel with the wiper direction. However, it will be understood that other directions of the checkerboard pattern may be used and the direction of the checkerboard pattern may be varied between layers.

The hull is formed, in this embodiment, by two boundary scan paths 205, 206. However, one or more boundary scan paths may be used.

The parameters, such as laser spot size, point distance, point exposure time and laser power specified for the core scan paths may be different to the parameters specified for the boundary scan paths 205, 206.

Referring to FIG. 7, the processor 131 sorts the scan paths based on build styles (scans that require different build parameters). Typically, different build parameters are used for the boundary scans in a hull and core strategy compared to the checkerboard scans. Accordingly, for the scan paths shown in FIG. 6, there are two build styles into which the scan paths are sorted. The scan paths 204, 205, 206 are then grouped to form regions to be placed in a scanning order. The extent to which scan paths 204, 205, 206 are grouped together into regions will depend on the nature of the scan paths. In FIG. 6, each square 203 of the checkerboard is identified as a region to be ordered and each separate boundary scan 205, 206 is identified as a region to be ordered. A number of scan paths grouped into a region will depend on balancing speed of processing against resolution for the scan path ordering. In FIG. 6, the squares 203 of the checkerboard pattern are shown as quite large relative to the powder bed 104 but, typically, the squares will be smaller. With smaller squares, the scan paths of multiple squares may be grouped together into a region to be sorted to achieve the desired balance.

The powder bed is conceptually divided into three or more sections, in this embodiment, sections A, B and C. The processor 131 then determines whether each region 203, 205, 206 of scan paths of a particular type falls within section A, B, C or a combination of the sections A, B and C. In FIG. 6, there are regions 203a, 203b, and 203c that fall entirely within sections A, B or C, respectively, and regions 203d, 203e that straddle two sections A and B or B and C. Both boundary scan paths 205 and 206 straddle all three sections A, B and C.

The regions are then sorted into a scanning order based upon the section(s) A, B and C into which each region falls. FIG. 8 schematically illustrates an order in which different sections of the powder bed 104 become available for scanning as the wiper 109 moves back and forth across the bed, with the direction of time illustrated by arrow, T. The timeline is for illustrating how the availability of the sections A, B and C progresses for the purpose of ordering scanning of the regions and does not necessarily represent the time that each set of sections A, B and C is available for scanning. In one embodiment, it may be possible for the processor 131 to dynamically alter the speed of the wiper 109 to ensure that sufficient time is made available for scanning regions that fall within a particular set of sections A, B and C. The bracketed periods labelled "Out" represent a period in which the wiper 109 moves across the powder bed 104 on an out-stroke and the bracketed periods labelled "Return" represents a period in which the wiper 109 moves across the powder bed 104 on a return stroke. On each out stroke powder material is solidified in both a lower layer that was spread on the previous out stroke and the layer being spread on the current out stroke. The dotted line represents a transition of the scanning between these layers. Period E between out and return strokes represents the time the wiper 109 is located to a side of the powder bed 104 during which time the entire powder bed 104 is available for scanning. Period D between return and out strokes represents the time the wiper 109 is located to the other side of the powder bed 104 during which time powder is dosed for spreading the next layer and again, the entire powder bed 104 is available for scanning.

To determine an order in which the regions of a layer are scanned, scanning of each region is allocated to a time period in which the section or combination of sections A, B, C in which the region falls is available for scanning. The time periods are filled in the order indicated by arrows $S_1$ and then $S_2$. Accordingly, first regions 203 that fall within section A will be allocated to the first time period until that time period is full or there are no more regions that fall within section A to be allocated, then regions that fall within sections A, B or A and B will be allocated to the second time period and then regions that fall within section C will be allocated to the $10^{th}$ period. Allocation continues in the direction of arrow $S_2$ until all regions have been allocated a time period for scanning, the final period for allocation being the third time period. The third (and/or possibly the $8^{th}$) time period may be expanded by scheduling a delay in the wiper movement if such a delay is required to complete scanning of the layer Priorities may be given to allocating regions to time periods in which more than one section A, B, C is available for scanning. For example, regions that span sections may be prioritised over regions that lie entirely within one section for allocation to such time periods. For example, in FIG. 6, the allocation of the boundary scans 205, 206 to the $3^{rd}$ and/or $8^{th}$ periods may be prioritised over the allocation of regions 204 to these periods.

During the $8^{th}$ time period the build platform is lowered. In this embodiment, scanning that is allocated to the $8^{th}$ time period continues during lowering of the build platform 102. The regions allocated to be scanned during lowering of the build platform 102 may be regions that can be scanned with the laser beam at an angle to a surface of the powder bed 104 above a preset angle that is greater than an angle that the laser beam makes to the surface when scanning other regions of the powder bed 104. The preset angle may be set by the user.

Once the regions 203, 205 and 206 have been allocated to certain time periods, this information can be incorporated into instructions for driving the scanner 106 during a build.

Figure 9:
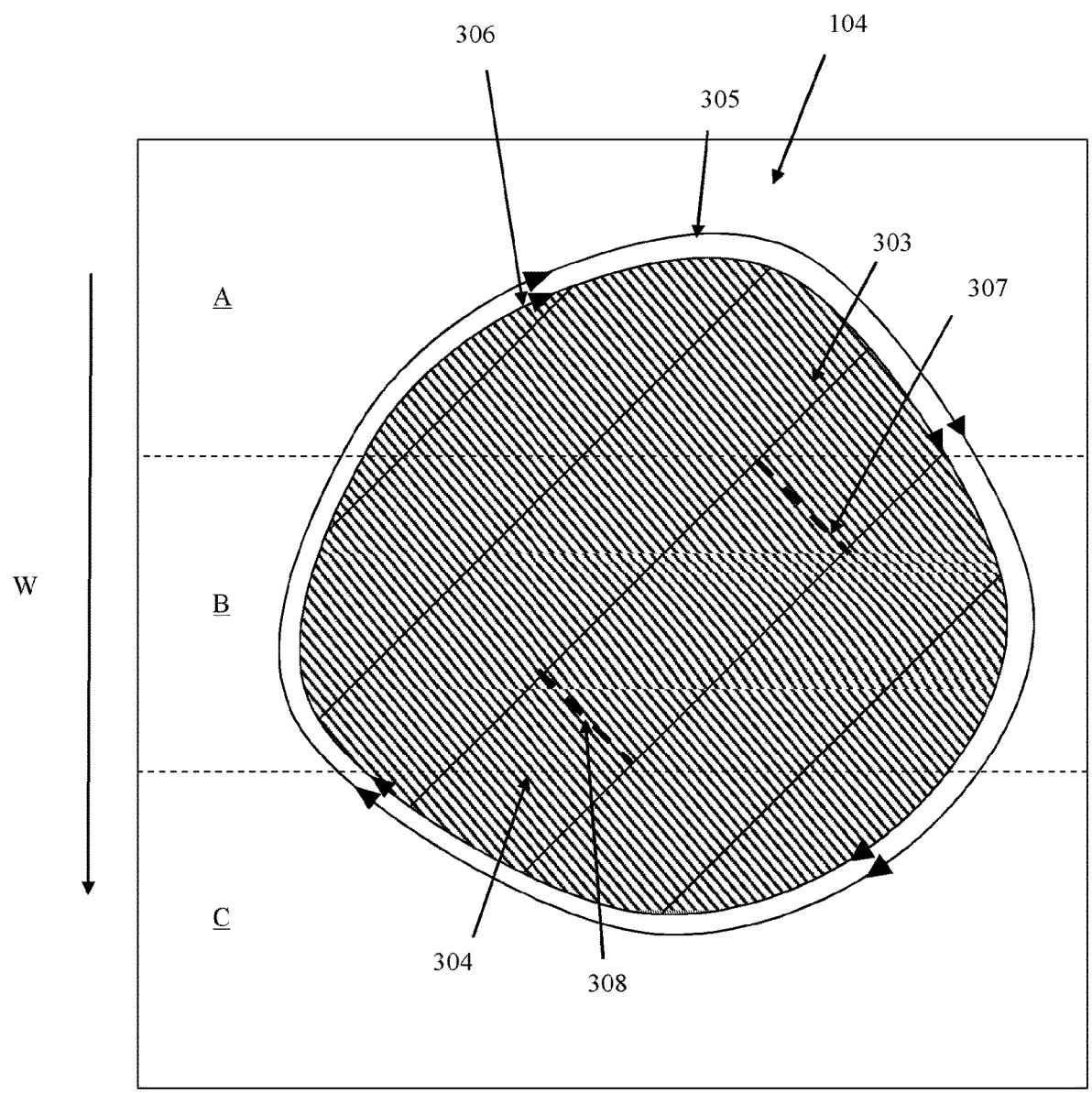
FIG. 9 shows scan paths for an area to be solidified in a powder layer, in which a core of the area is to be formed using a stripe pattern of scan paths.

The scan paths described with respect to FIG. 6 are for illustrative purposes only and numerous other scan paths designs and methods for scheduling regions to be scanned are possible. For example, in FIG. 9 the area to be solidified is divided into parallel striped regions 303, rather than square regions, the parallel scan paths 303 of each striped region 303 extending transverse to the longitudinal direction of the stripe. Depending on the direction of the striped regions 303, the striped regions 303 may extend into all three sections A, B and C. To avoid all scanning being allocated to the $3^{rd}$ and $8^{th}$ time periods, wherein all sections of the powder bed 104 are available for scanning, the striped regions 303 may be divided into smaller sub-regions that fall within a lesser number of the sections A, B and C such that scanning of these smaller sub-regions can be spread across other ones of the time periods. Each striped region 303 may be divided along one or more lines that avoid dividing scan paths 304 of the striped region 303. For example, the striped region 304 may be divided into smaller regions along dotted lines 307, 308 that are parallel with the scan paths 304. This will help to ensure that progression of the melt front is substantially the same for each of the sub-regions as would have been the case for the larger striped region 303. The scanning of these sub-regions is then scheduled using the algorithm described with reference to FIGS. 7 and 8.

Figure 10:
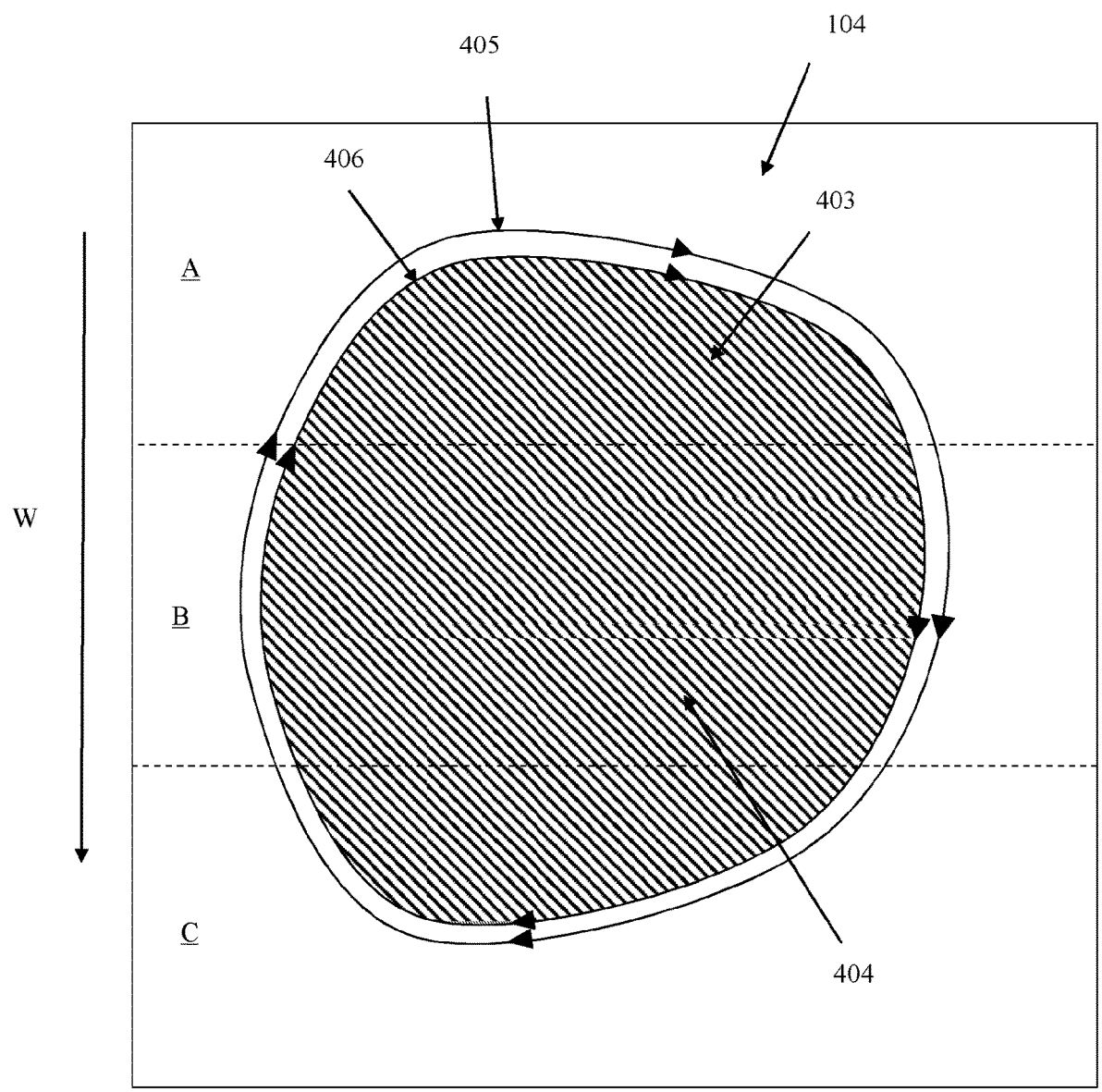
FIG. 10 shows scan paths for an area to be solidified in a powder layer, in which a core of the area is to be formed using a raster scan.

FIG. 10 shows an embodiment wherein the scan paths of the core form a raster scan 403 that extends over the entire width of the core. As with the embodiment shown in FIG. 8, to avoid the entire raster scan being allocated to time periods in which all sections A, B and C are available for scanning, the raster scan 403 is divided into sub-regions that can be scanned during other time periods. For the raster scan 403, splitting of any one scan path 404 of the raster scan may be acceptable as, unlike the checkerboard pattern and striped pattern, there is no attempt with the raster scan 403 to maintain a constant length of each scan path 404. Accordingly, the raster scan 403 may be divided into sub-regions along the border lines of sections A, B and C. The scanning of these sub-regions is then scheduled using the algorithm described with reference to FIGS. 7 and 8.

It will be understood that, if an area to be solidified falls within only some, not all, of the sections A, B and C, it may not be necessary to divide up the stripped pattern or raster scan for the purposes of scheduling.

Figure 11:
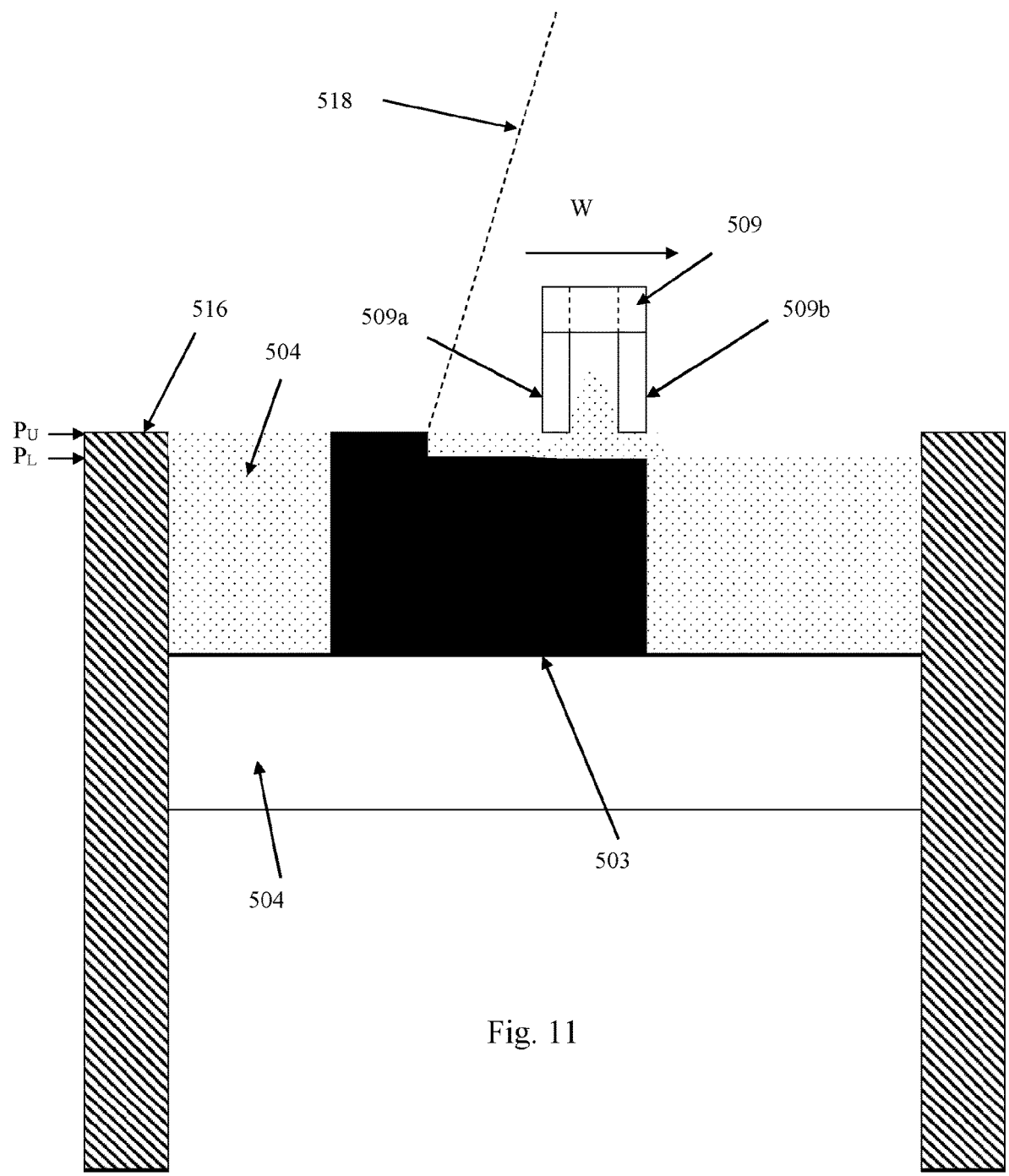
FIG. 11 is a schematic of apparatus in which a wiper can spread powder in both directions.

FIG. 11 shows a wiper unit in accordance with another embodiment of the invention. In this embodiment, the wiper arrangement 509 is arranged to spread powder in both directions of travel across the powder bed 504. The wiper unit 509 comprises two wipers 509a and 509b mounted a fixed distance apart. Powder is dispensed into the gap between the wipers 509a and 509b, with wiper 509a spreading powder into a layer as the wiper unit 509 moves from left to right across the powder bed 504 and wiper 509b spreading powder into a layer as the wiper unit 509 moves from right to left across the powder bed 504. For both directions of movement across the powder bed, the laser is scanned across the powder bed 404 both in front of the wiper unit 509 and behind the wiper unit 509. As described previously with the embodiment shown in FIGS. 1 to 6, when scanning in front of the wiper unit 509, the scanner 106 focuses the laser beam to maintain a desired laser spot size on a lower plane $P_L$ corresponding to the lower surface of the powder bed 504 that is in front of the wiper 509 and, when scanning behind of the wiper unit 509, the scanner 106 focuses the laser beam to maintain a desired laser spot size on an upper plane $P_U$ corresponding to the higher surface of the powder bed 504 that is behind of the wiper unit 509.

In an alternative embodiment (not shown), the apparatus may comprise multiple laser beams (generated by separate lasers or by splitting one or more laser beams), each laser beam directed to the powder bed by separate scanning optics such that the powder bed can be simultaneously scanned both sides of the wiper.

Furthermore, the wiper may be arranged to be moved vertically during the build such that powder can be dosed from only one side of the build platform, with the wiper being raised at the other side of the build platform and moved over the heap of powder remaining after spreading of a layer so that the wiper can push the heap of powder back on the other direction to spread a further layer of powder. Furthermore, the wiper may be moved vertically during spreading of a layer to form non-planar layers. For example, higher laser power may be used to solidify powder in the deeper powder regions of the non-planar layer, wherein whether or not a thicker region of powder is formed may be based on geometry of the object and required tolerances for the object.

It will be understood that alterations and modifications may be made to the above described embodiments without departing from the scope of the invention as defined herein. For example, the powder bed may be scanned on only one of an out stroke and a return stroke of the wiper. The scanner may be arranged to only maintain a focus of the scanner in the lower plane $P_L$, for example using a ID lens, the scanner directing the laser beam to scan parts of the powder bed that have a surface in this plane (such as in front of the wiper on the out stroke and both in front and behind the wiper on a return stroke).

The build platform may be lowered or raised during spreading of powder across the powder bed with the wiper to provide a layer of variable thickness. All three of scanning the laser beam with the wiper, spreading a layer with the wiper and lowering or raising of the build platform may occur simultaneously. Lowering of the build platform may occur continuously throughout the build. This may increase the speed of the build as delays in the spreading of powder whilst the build platform is lowered may be avoided.

The invention claimed is:

1. A selective solidification apparatus comprising a build chamber, a build platform lowerable in the build chamber, a wiper for spreading powder material across the build platform to successively form powder layers of a powder bed over each other, the apparatus being configured to complete the spreading of the powder material across the build platform to form each powder layer before spreading powder material across the build platform to form a successive powder layer, an energy beam unit for generating an energy beam for consolidating the powder material, a scanner for directing and focusing the energy beam onto each powder layer and a processor for controlling the scanner, wherein the processor is programmed to control the scanner to scan the energy beam across the powder bed to consolidate powder material on either side of the wiper when the wiper is moving across the powder bed and to scan the energy beam across a one of the powder layers during two or more strokes of the wiper across the powder bed such that the scanner scans the energy beam across the same powder layer during each of the two or more strokes, wherein the two or more strokes comprise a stroke in which the wiper forms the one of the powder layers and one or more subsequent strokes of the wiper.

2. A selective solidification apparatus according to claim 1, wherein the one or more subsequent strokes comprise a stroke in which the wiper forms a subsequent powder layer.

3. A selective solidification apparatus according to claim 1, wherein the one or more subsequent strokes comprise a return stroke in which the wiper does not form a powder layer.

4. A selective solidification apparatus according to claim 1, wherein the processor is programmed to control the scanner to scan the energy beam across the powder bed such that a first region on the one of the powder layers is consolidated by the energy beam when the wiper is moving away from the first region during formation of the one of the powder layers with the wiper and a second region on the one of the powder layers is consolidated by the energy beam when the wiper is moving towards the second region during the subsequent stroke.

5. A selective laser solidification apparatus according to claim 1, wherein the processor is programmed to control the scanner to change a focus of the energy beam to adjust for a change in a level of an upper surface of the powder bed.

6. A selective laser solidification apparatus according to claim 5, wherein, the processor is programmed to control the scanner to change the focus of the energy beam to compensate for a change in level of the powder bed as the energy spot is moved from one side of the wiper to the other as the wiper moves across the powder bed.

7. A selective laser solidification apparatus according to claim 5, wherein the processor is programmed to control the scanner to change the focus of the energy beam to compensate for a change in level of the upper surface of the powder bed between an out stroke and a return stroke of the wiper.

8. A selective laser solidification apparatus according to claim 5, wherein the energy beam comprises a laser beam and the scanner comprises movable optics for changing the focus of the laser beam.

9. A selective laser solidification apparatus according to claim 8, wherein the scanner comprises titling optics for scanning the laser spot across the powder bed, wherein the processor is programmed to control the tilting optics to automatically compensate for the fact that a single position of the titling optics will scan different positions on the upper surface of the powder bed dependent on the level of the upper surface.

10. A selective laser solidification apparatus according to claim 1 further comprising a position measuring device for measuring a position of the wiper as the wiper moves across the powder bed and the processor is arranged to receive signals from the position measuring device and is programmed to control the scanner based upon the signals from the position measuring device.

11. A method for forming an object by selective solidification, in which powder layers are solidified using an energy beam in a layer-by-layer manner to form an object, in a selective solidification apparatus comprising a build chamber, a build platform lowerable in the build chamber, a wiper for spreading powder material across the build platform, an energy beam unit for generating an energy beam for consolidating the powder material, and a scanner for directing and focusing the energy beam onto each powder layer, the method comprising, repeatedly, spreading powder material across the build platform with the wiper to successively form powder layers of a powder bed over each other, the apparatus being configured to complete the spreading of the powder material across the build platform to form each powder layer before spreading powder material across the build platform to form a successive powder layer, and, during movement of the wiper across the powder bed, scanning the energy beam across the powder bed to consolidate the powder material either side of the wiper and to scan the energy beam across a one of the powder layers during two or more strokes of the wiper across the powder bed such that the scanner scans the energy beam across the same powder layer during each of the two or more strokes, wherein the two or more strokes comprise a stroke in which the wiper forms the one of the powder layers and one or more subsequent strokes of the wiper.

12. A method according to claim 11, wherein the one or more subsequent strokes comprise a stroke in which the wiper forms a subsequent powder layer.

13. A method according to claim 11, wherein the one or more subsequent strokes comprise a return stroke in which the wiper does not form a powder layer.

14. A method according to claim 11, wherein a first region on the one of the powder layers is consolidated by the energy beam when the wiper is moving away from the first region during formation of the one of the powder layers with the wiper and a second region on the one of the powder layers is consolidated by the energy beam when the wiper is moving towards the second region during the subsequent stroke.

15. A method according to claim 11, further comprising changing a focus of the energy beam to adjust for a change in a level of an upper surface of the powder bed.

16. A method according to claim 15, comprising changing the focus of the energy beam during spreading of powder by the wiper as the spot of the energy beam is moved from one side of the wiper to the other.

17. A method according to claim 15 comprising changing the focus of the energy beam to compensate for a change in level of the upper surface of the powder bed between an out stoke and a return stroke of the wiper.

* * * * *